(12) United States Patent
North et al.

(10) Patent No.: US 10,839,571 B2
(45) Date of Patent: Nov. 17, 2020

(54) DISPLAYING LARGE DATA SETS IN A HEAT MAP

(71) Applicant: Merck Sharp & Dohme Corp., Rahway, NJ (US)

(72) Inventors: Stephen C. North, Lebanon, NJ (US); David J. Tabacco, Phillipsburg, NJ (US); David B. Hurry, Mount Airy, MD (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 0 days.

(21) Appl. No.: 16/186,146

(22) Filed: Nov. 9, 2018

(65) Prior Publication Data

US 2020/0151924 A1  May 14, 2020

(51) Int. Cl.
| | |
|---|---|
| *G06T 11/20* | (2006.01) |
| *G06T 3/40* | (2006.01) |
| *G06F 16/26* | (2019.01) |
| *G06F 16/22* | (2019.01) |
| *G06T 11/00* | (2006.01) |
| *G06F 3/0482* | (2013.01) |

(52) U.S. Cl.
CPC ........ *G06T 11/206* (2013.01); *G06F 16/2246* (2019.01); *G06F 16/26* (2019.01); *G06T 3/40* (2013.01); *G06F 3/0482* (2013.01); *G06F 2203/04806* (2013.01); *G06T 11/001* (2013.01)

(58) Field of Classification Search
CPC ....... G06T 11/206; G06T 3/40; G06T 11/001; G06F 16/2246; G06F 16/26; G06F 3/0482; G06F 2203/04806
See application file for complete search history.

(56) References Cited

U.S. PATENT DOCUMENTS

| | | | |
|---|---|---|---|
| 9,442,637 B1 | 9/2016 | Kocsor | |
| 2011/0261049 A1* | 10/2011 | Cardno | ................. G06Q 10/10 |
| | | | 345/419 |
| 2011/0302194 A1* | 12/2011 | Gonzalez | ................ G06F 16/29 |
| | | | 707/769 |
| 2012/0120086 A1* | 5/2012 | Dang | .................... G06F 16/904 |
| | | | 345/589 |

(Continued)

OTHER PUBLICATIONS

Jeffrey Mellen et al., U.S. Appl. No. 62/691,593 (Year: 2018).*

(Continued)

*Primary Examiner* — Chante E Harrison
(74) *Attorney, Agent, or Firm* — Fenwick & West LLP

(57) ABSTRACT

Large data sets (e.g., with millions of records) are represented by a heat map within a user interface (UI). Each record in the data set includes a label. The labels of the records are assigned to leaf nodes of a data structure. The leaf nodes are mapped to a grid of cells according to a layout method. Furthermore, values are determined for the cells based on data records having the labels mapped to the cells. A visual property is selected for each cell based on the corresponding value. Since the data labels are stored in leaf nodes that are connected to internal nodes, if a zoom state of the heat map results in a display of a number of data labels that exceeds the number of cells in the grid, values of the cells can be updated according to values determined from the internal nodes without losing the connections between the cells and the underlying leaf nodes.

21 Claims, 6 Drawing Sheets

(56) References Cited

U.S. PATENT DOCUMENTS

| | | | |
|---|---|---|---|
| 2013/0257903 A1 | 10/2013 | Hao et al. | |
| 2014/0297835 A1* | 10/2014 | Buys | H04L 43/0817 |
| | | | 709/224 |
| 2015/0113379 A1 | 4/2015 | Wakefield et al. | |
| 2016/0371814 A1 | 12/2016 | Chen et al. | |
| 2017/0235466 A1* | 8/2017 | Tanwir | G06Q 10/067 |
| | | | 715/738 |
| 2017/0323028 A1* | 11/2017 | Jonker | G06F 16/9024 |
| 2018/0121539 A1* | 5/2018 | Ciulla | G06F 16/367 |
| 2018/0225802 A1* | 8/2018 | Vij | G06T 1/20 |
| 2019/0138194 A1* | 5/2019 | Ryan | G06F 3/0484 |
| 2019/0197206 A1* | 6/2019 | Dembo | G06F 17/5009 |
| 2020/0005902 A1* | 1/2020 | Mellen | G16B 20/40 |

OTHER PUBLICATIONS

Keim, D., "Pixel-oriented Visualization Techniques for Exploring Very Large Databases," Journal of computational and graphical statistics 5 (1996), 1, 23 pages, [Online] [Retrieved on Jan. 29, 2019] Can be retrieved at URL: <https://pdfs.semanticscholar.org/ce1e/b9ed41232690a1ab0b6b7322cfdbl0a385cc.pdf>.

Keim, D. et al., "VisDB: Database Exploration Using Multidimensional Visualization," IEEE Computer Graphics and Applications, vol. 14, Issue 5, Sep. 1994, 27 pages, [Online] [Retrieved on Jan. 29, 2019] Can be retrieved at URL: <https://pdfs.semanticscholar.org/381d/59680daf635e7750661262855b486816302f.pdf>.

PCT International Search Report and Written Opinion, PCT Application No. PCT/US2019/060501, dated Apr. 21, 2020, 11 pages.

* cited by examiner

400

```
┌─────────────────────────────────────────────────────────────┐
│ Receive data records from one or more databases, each of the data │
│   records having a label selected from a plurality of labels  │
│                            405                               │
└─────────────────────────────────────────────────────────────┘
                              ▼
┌─────────────────────────────────────────────────────────────┐
│         Assign labels to root nodes of a data structure      │
│                            410                               │
└─────────────────────────────────────────────────────────────┘
                              ▼
┌─────────────────────────────────────────────────────────────┐
│  Map, for a first zoom state, at least some of the root nodes to │
│ corresponding cells in a grid of cells provided for display as part of a │
│  user interface, the root nodes mapped to corresponding cells according │
│                       to a layout method                     │
│                            415                               │
└─────────────────────────────────────────────────────────────┘
                              ▼
┌─────────────────────────────────────────────────────────────┐
│  Connect, according to the layout method, internal nodes of the data │
│ structure to corresponding pluralities of the root nodes, the connecting │
│  of a particular internal node based on the layout method mapping the │
│ corresponding plurality of root nodes to cells that are proximate in the │
│                          grid of cells                       │
│                            420                               │
└─────────────────────────────────────────────────────────────┘
                              ▼
┌─────────────────────────────────────────────────────────────┐
│ Determine values for the cells, the value for a cell based on data │
│    records having the label of the corresponding leaf node   │
│                            425                               │
└─────────────────────────────────────────────────────────────┘
                              ▼
                           To 430
```

From 425

Provide for display in the heat map, in the first zoom state for which a number of leaf nodes to be displayed is less than or equal to a number of cells in the grid, at least a portion of the grid of cells, a display property of each displayed cell based on the value for that cell
430

Map, for a second zoom state, wherein in the second zoom state a number of leaf nodes to be displayed exceeds the number of cells in the grid, at least some of the internal nodes to corresponding cells in the grid of cells
435

Determine update values for the cells, the updated values based on data records having a label corresponding to one of the leaf nodes connected to the internal node
440

Provide for display in the heat map, in the second zoom state, at least a portion of the grid of cells, an updated display property of each displayed cell based on the updated value for that cell
445

FIG. 4B

DISPLAYING LARGE DATA SETS IN A HEAT MAP

TECHNICAL FIELD

The present disclosure relates to data visualization, and in particular, to a visual representation in which particular cells may be mapped to multiple data records.

BACKGROUND

A typical method of analyzing a data set involves displaying data via a heat map. A heat map is a graphical representation of data that includes a grid of cells, each cell representing a data value and assigned a color corresponding to the data value. Thus, data can be analyzed by visually assessing the colors of the heat map. This can assist in identifying trends within data sets.

However, heat maps can be limited by the number of cells in the grid. Thus, heat maps can be problematic when displaying large data sets. For example, a data set may need to be truncated if it includes more data values than the number of cells available in the heat map grid. Alternatively, multiple data values may be represented by a single cell with a single, aggregate value being generated from the individual data values. Thus, the original data becomes hidden and can hinder data analysis.

SUMMARY

Embodiments relate to a method of rendering a heat map for presentation through a visual interface. A plurality of data records is received from one or more databases. Each data record has a label selected from a plurality of labels. The labels are assigned to leaf nodes of a data structure. For a first zoom state, at least some of the leaf nodes are mapped to cells in a grid of cells provided for display as part of a user interface (UI). The leaf nodes are mapped to their corresponding cells according to a layout method. According to the layout method, internal nodes of the data structure are connected to corresponding pluralities of the leaf nodes. The connecting of an internal node is based on the layout method that maps the plurality of leaf nodes to cells that are proximate to each other in the grid of cells. Values for the cells are determined. A value for a cell is based on data records having the label of the corresponding leaf node. In a first zoom state, at least a portion of the grid of cells is provided for display in the heat map. A display property of each displayed cell is based on the value for that cell. In the first zoom state, the number of leaf nodes to be displayed is less than or equal to a number of cells in the grid. For a second zoom state, at least some of the internal nodes are mapped to corresponding cells in the grid of cells. In the second zoom state, a number of leaf nodes to be displayed exceeds the number of cells in the grid. Updated values for the cells are determined. The updated values are based on data records having a label corresponding to one of the leaf nodes connected to the internal node. In the second zoom state, at least a portion of the grid of cells is provided for display in the heat map. An updated display property of each displayed cell is based on the updated value for that cell.

BRIEF DESCRIPTION OF DRAWINGS

Figure (FIG. 1 is an illustration of a heat map displayed in a user interface (UI) on a display, according to one embodiment.

FIGS. 4A and 4B together illustrate a flow chart of a method for displaying a heat map, according to one embodiment.

Figure 1:
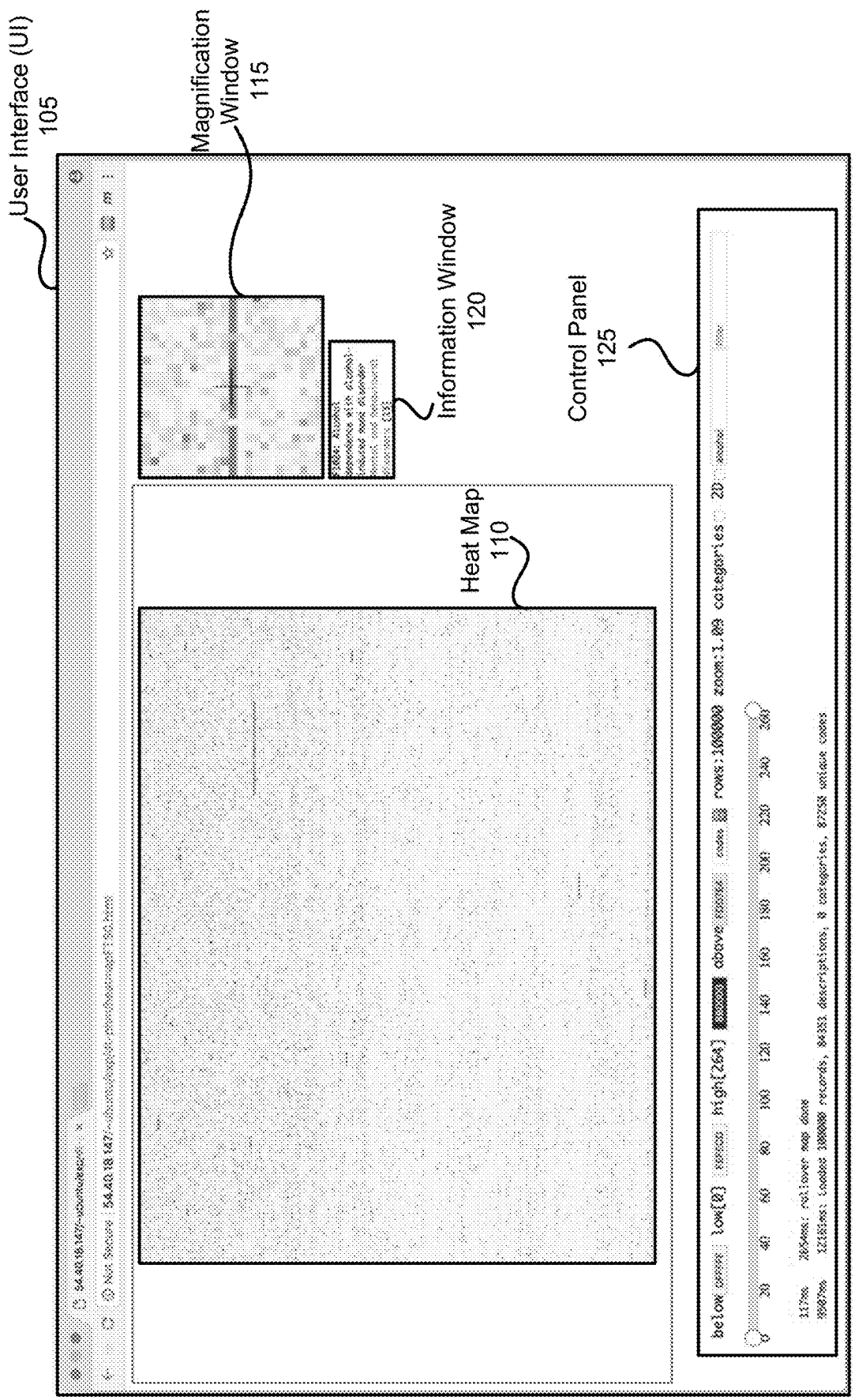

The figures depict various embodiments of the present disclosure for purposes of illustration only.

One skilled in the art will readily recognize from the following discussion that alternative embodiments of the structures and methods illustrated herein may be employed without departing from the principles of the disclosure described herein.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Large data sets (e.g., with millions of records) are represented by a heat map within a user interface (UI). Each record in the data set includes a label. The data labels of the data records are assigned to leaf nodes of a data structure (such as a tree data structure). The leaf nodes (and thus the assigned data labels) are mapped to a grid of cells according to a layout method (e.g., according to a Hilbert curve). Furthermore, values are determined for the cells based on data records having the labels mapped to the cells. A visual property (e.g., a color, shading intensity, size, vibration, translucency, etc.) is selected for each cell based on the corresponding value. Since the labels are stored in leaf nodes that are connected to internal nodes, if a zoom state of the heat map results in display of a number of data labels that exceeds the number of cells in the grid of the heat map, values of the cells can be updated according to values determined from the internal nodes without losing the connections between the cells and the underlying leaf nodes. In other words, when zoomed out passed a certain threshold, the values assigned to cells can be determined by aggregating labels that the layout method places in close proximity in the display.

Thus, among other advantages, the UI displays an improved heat map over traditional heat maps. With large data sets and limited screen space, the UI, through the data mapping structure, can provide a heat map that allows a viewing user to view and access underlying data in a data set even when cells of the heat map display aggregated values. Furthermore, due to the data structure, the system can efficiently keyword search the underlying records and highlight the corresponding cells in the heat map. Collectively, the UI features may enable users to more efficiently and more intuitively navigate through a large data set because high level structural features can be viewed in conjunction with the underlying individual data records.

Figure (FIG. 1 is an illustration of a heat map 110 displayed in a user interface (UI) 105 on a display, according to one embodiment. The UI 105 includes the heat map 110, a magnification window 115, an information window 120, and a control panel 125. In some embodiments, the UI 105 includes different and/or other components than those shown in FIG. 1.

The UI 105 is a software interface that enables a user to view and interact with the heat map 110 on a display. The UI 105 is displayed on a display, such as a monitor. The UI 105 can be displayed in a web browser. In some embodiments, the UI 105 is generated using an HTML 5 canvas. For example, cells are defined by one or more coordinates in an HTML 5 canvas. In other embodiments, other data structures and protocols may be used.

In the embodiment shown in FIG. 1, the heat map 110 is a graphical representation of a set of data records in a grid of colored cells. The color of the cells can represent values of the records. In another example, the cells of the heat map 110 are colored according to categories that describe groups of data records, such as value ranges, numbers of records having a corresponding label, or the like. The heat map 110 can display representations of large data sets (e.g., with millions of data records). If the number of data labels exceeds a maximum number of available cells in the grid of the heat map 110, the UI 105 can display a merged view of the heat map 110.

In one embodiment, the UI 105 displays a merged view based on the number of pixels available for each cell is below a threshold. For example, the UI 105 may display a merged view if the number of data labels exceeds the number of pixels through which the heat map 110 is being displayed. In another example, the UI 105 displays a merged view if the size of a cell is smaller than a size of a pixel of the display (or a predetermined area of display pixels, such as a 100×100 pixel patch). In another embodiment, a merged view is not dependent on the number or size of pixels of the display. For example, the UI displays a merged view if the number of data labels exceeds a threshold number of cells.

The merged view displays cells with merged values. The merged values are based at least in part, on groups of data labels. For example, a value of a cell in a merged view can be an average value determined from data records having any one of two or more data labels (e.g., labels mapped to cells that are proximate to each other in an unmerged view). The heat map 110 can display a merged view in response to a change in the zoom state. In some embodiments, the heat map 110 displays a different merge view for each zoom state. Among other advantages, if the heat map 110 displays a merged view, the information of the underlying data labels is not lost or masked. For example, if a user selects a cell of a merged view, the information of the contributing data labels (e.g., records with those labels) can be displayed to the user.

The magnification window 115 is a magnified view of a portion of the heat map 110. The magnified view can be a portion of the heat map selected by a user (e.g., clicked on). The magnification window 115 can allow a user to view portions of heat map 110 without changing the zoom state of the heat map 110. In some embodiments, the magnification window 115 displays cells that are not displayed in the heat map 110. For example, if the UI 105 displays a merged view of the heat map 110, the magnification window 115 can display unmerged cells of the heat map 110.

The information window 120 displays information of one or more data labels (e.g., records with those labels) represented by the heat map 110. The information may be associated with a cell or a group of cells selected by a user (e.g., clicked on). If the heat map 110 displays a merged view, the information can be associated with a cell or group of cells from an unmerged view. In some embodiments, if a portion of the heat map is zoomed in past a threshold, information of one or more data labels (e.g., records with those labels) represented by the heat map 110 are displayed inside the cells.

The control panel 125 displays tools for a user to communicate with the UI 105. Examples of tools in the control panel 125 include a color legend, color control, keyword search, range limiter (i.e., a tool that limits the maximum and minimum values to be displayed by the heat map), a filter (e.g., a user can hide inactive cells from the heat map 110), and a normalizer (e.g., the values of the data labels can be normalized across multiple data sets). In some embodiments, the control panel 125 includes a zoom tool that allows a user to view different zoom states (e.g., magnification levels) of the heat map 110. For example, a user can magnify or shrink portions the heat map 110. In some embodiments, the control panel 125 includes a pan tool that allows a user to change the set of cells visible in the window of the heat map 110 by moving the boundaries of the window on the global grid of cells. In some embodiments, the control panel 125 includes a tool to change or modify the layout method of the cells of the heat map 110 (described further with respect to FIG. 2). In some embodiments, the control panel 125 displays general information about the data labels, such as lowest, highest, and average values represented in the heat map. The control panel 125 can also include an indication of a number of data labels and/or data records represented in the heat map 110.

Figure 2:
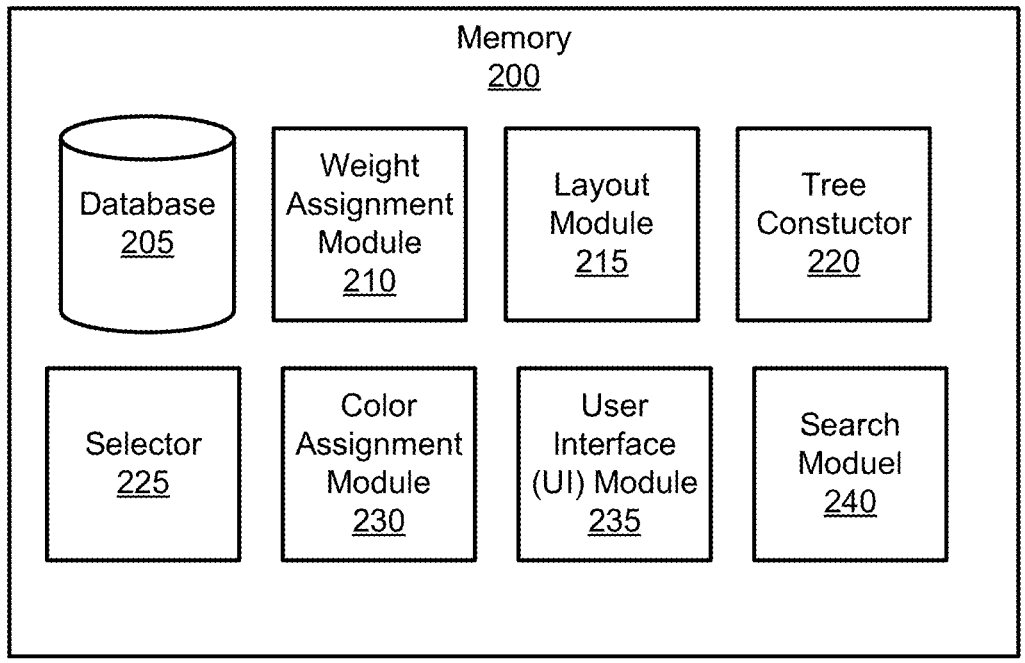
FIG. 2 is a block diagram of software modules for displaying the heat map, according to one embodiment.

FIG. 2 is a block diagram of software modules for displaying the heat map 110 in a memory 200, according to one embodiment. The memory 200 may store, among other modules, a database 205, a value assignment module 210, a layout module 215, a tree constructor 220, a selector 225, a color assignment module 230, a user interface 235, and a search module 240. The memory 200 may include other modules not illustrated in FIG. 2.

The database 205 stores the data set of data records represented in the heat map. The database 205 may be stored on a local computing machine or be stored across multiple computing machines. For example, the data set is so large that it cannot be stored on a single machine. Additionally, the database 205 may be stored on another component other than the memory 200, such as a storage unit (see FIG. 5).

In some embodiments, the data set is a one-dimensional array of data records. Each data record includes a label from a set of labels. For example, the set of labels may be Medicare provider codes or international classification of diseases (ICD) diagnostic codes (e.g., ICD9 or ICD10 diagnostic codes). In these examples, a data record may be a single incident of a disease and the label is the code for the disease. The record may include additional information related to the incident (described below). Each data label includes a value based on the data records having the label. In one embodiment, the value of a data label is a count of the number of occurrences (number of records) of the label in the database 205. In another embodiment, the value is determined such that some occurrences of data records contribute more to the value than others. For example, the data records may be weighted based on a seriousness or importance of the event or entity that it represents. In other embodiments, other methods of assigning a value to a label based on the records having that label may be used. In some embodiments, if data records have the same label, the data records are merged to form a single data record=with combined values (e.g., by summing or taking an average of values in the individual data records). The value for a combined record may be assigned by the value assignment module 210 (described below).

Data records can include additional information such as descriptions and categories. The descriptions can be text and/or numbers that describe the data record. For example, a description includes additional labels associated with the data record. In another example, a description includes information such as a patient ID, a date of occurrence and entry, a description of an event, a treatment provided, etc. Each data record can also be assigned into categories. Furthermore, each label can be assigned into categories. The categories can describe ranges of the label, the value of the data record, such as 'low,' 'medium,' and 'high' values, numbers of records having a corresponding label, or the like. The categories can be manually defined by a user.

In some embodiments, the value assignment module 210 assigns values to the data labels stored in the database 205. For example, the value assignment module 210 sorts the data records according to label and assigns a value to the label that is a count of the number of occurrences of the label in the database 205 or uses any other appropriate method to assign a value to the label based on the records that have that label.

The layout module 215 arranges the data labels in the grid of cells of the heat map 110 according to a layout method. In some embodiments, the layout module 215 maps leaf nodes (associated with the data labels) to cells in the grid. The layout module 215 can arrange the data labels and leaf nodes in the grid according to a space-filling curve, such as a Hilbert Curve, major row order, IsoMatch, constrained multidimensional scaling (MDS), or minimizing the total root mean square error (RMS) error of given target distances.

The tree constructor 220 constructs a tree data structure. The tree constructor 220 can construct any type of tree data structure. For example, the tree constructor 220 constructs a quad tree. The tree data structure includes a plurality of levels, internal nodes, and leaf nodes. The leaf nodes are assigned to data labels in the database 205 and mapped to the grid of cells. The internal nodes can be connected to the leaf nodes near each other in the grid of cells. For example, an internal node is connected to four leaf nodes mapped to adjacent cells in the grid. The internal nodes can have values based, at least in part, on values of the labels assigned to the children nodes. These values can be determined by any function. For example, the value of each internal node may be the average (e.g., a weighted average) of the values of the children nodes linked to the internal node. In another example, the value of each internal node is the largest or smallest value of the values of the children nodes linked to the internal node. The internal nodes can be initially determined or determined dynamically. For example, internal nodes of a level of the tree data structure may be determined after the selector 225 selects the level (the selector 225 is further described below). If the heat map 110 displays a merged view, the internal nodes (instead of the leaf nodes) and their assigned values may be mapped to the grid of cells of the heat map 110. An embodiment of a tree data structure is further described with reference to FIG. 3.

In other embodiments, other forms of data structures may be used to map nodes into groups. Any data structure may be used that maps data labels to the grid of cells and defines a mechanism for determining groups of cells to aggregate when the user zooms out. Examples of multidimensional search data structures that can be used include R-trees (including R*-trees), k-d trees, quad trees, and multidimensional hashing data structures. R-trees are balanced trees that group objects by minimum bounding rectangles. k-d trees are binary space partitioning trees where internal nodes split the search space. Quad trees (Oct-trees for 2D space) are trees with internal nodes that split the data space in a balanced manner. Multidimensional hashing data structures can be considered when queries focus on discrete points (e.g., integer pixel coordinates).

The selector 225 selects the values to be displayed in the heat map 110. Specifically, the selector 225 selects the values of nodes of the tree data structure to be assigned to cells in the grid of the heat map 110. For example, the selector 225 selects a level of the tree data structure to map nodes of that level to cells in the grid. This mapping may be based on the availability of cells in the grid to be displayed. The number of cells in the grid can depend on the number or size of pixels of the display of the heat map 110. For example, cells in the grid may be merged until the size of a cell is equal to or greater than the size of one or more pixels through which the heat map 110 is displayed. In another example, the number of cells in the grid is equal to a number of pixels available to display the heat map 110 in the UI 105. If a number of nodes in a level of the data tree structure to be displayed exceeds the number of cells in the grid, the selector 225 can select nodes in a different level of the data tree structure to be displayed. For example, if the number of leaf nodes exceeds the number of cells in the grid, the selector 225 selects internal nodes in a lower level of the tree data structure such that the number of internal nodes to be displayed is equal to or less than the number of cells in the grid.

The color assignment module 230 provides instructions for assigning colors to cells in the grid of the heat map 110. Each cell is assigned a color according the value of the cell. The color assignment module 230 can update the colors cells dynamically. For example, if the values of the cells are updated (e.g., after transitioning to a merged view), the color assignment module 230 can assign new colors to each cell according to the updated values. The color scheme can be determined by a user (e.g., through the control panel 125).

The user interface (UI) module 235 provides instructions (e.g., code) for generating and rendering the heat map 110 for presentation in a visual interface (e.g., the UI 105) on a display. The heat map 110 is displayed by displaying the colors of the cells of the grid assigned by the color assignment module 230. The heat map 110 in the UI 105 can be updated according to input and instructions (e.g., from a user). For example, if a user zooms out (e.g., using a zoom function of the UI 105) such that the number of nodes of the tree data structure to be displayed exceeds the number of cells in the grid, the colors of the cells in the heat map may be updated to allow the heat map 110 to display a merged view.

The search module 240 can search for data associated with data labels according to input or instructions from a user. For example, through the UI 105, a user can keyword search for information associated with data labels, such as data record, value, descriptions, and categories. In some embodiments, the results from the search module 240 are highlighted on the heat map. For example, through a keyword search, cells associated with the word "Poisoning" are highlighted in red. The search module 240 can search for data associated with data labels not displayed in the heat map. For example, if the heat map is displaying a merged view, the search module 240 can search through data labels not directly displayed in the heat map 110.

Figure 3B:
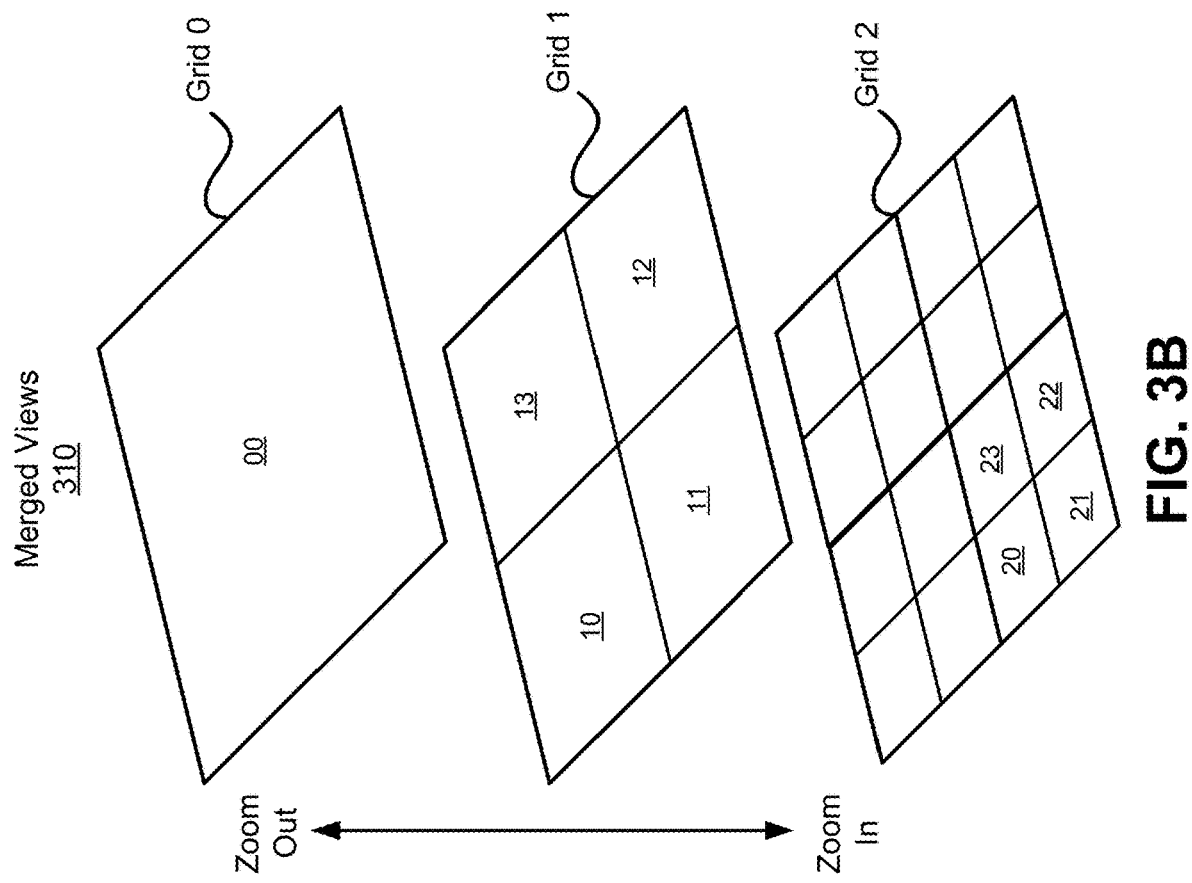
FIG. 3B illustrates portions of merged views of the heat map that can be displayed by the UI, according to one embodiment.
Figure 3A:
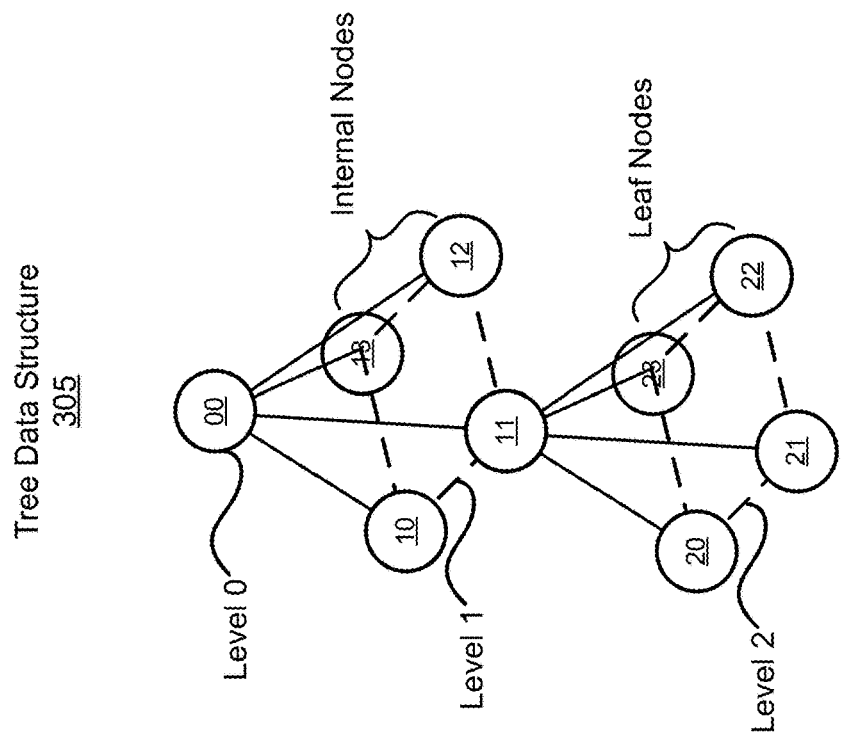
FIG. 3A is an illustration of a tree data structure, according to one embodiment.

FIG. 3A is an illustration of a tree data structure 305 constructed by the tree constructor 220, according to one embodiment. The tree data structure 305 includes levels 0-2. Level 2 includes leaf nodes 20-23. Level 1 includes internal nodes 10-13. Level 0 includes internal node 00 (node 00 may be the root node). The leaf nodes 20-23 are child nodes of node 11, and internal nodes 10-13 are child nodes of node 00. The tree data structure 305 can include additional levels and nodes than those shown in FIG. 3A. For example, nodes 10, 12, and 13 can each have children nodes. Although the tree data structure 305 is illustrated as a quad tree, the tree data structure 305 can be any type of tree data structure.

The data labels can be stored, represented, and accessed through the tree data structure 305. Each leaf node is associated with a data label of the data set. In some embodiments, the data labels are assigned to leaf nodes of the tree data structure by the layout module 215. The leaf nodes are also mapped to the grid of cells according to a space-filling curve. For example, the leaf nodes 20-23 are mapped to cells 20-23 of grid 2 according to a Hilbert curve. Grid 2 and cells 20-23 are described with reference to FIG. 3B. The values of the leaf nodes correspond to the values of the labels. The values of internal nodes are based, at least in part, on the values of the children nodes (e.g., labels mapped to cells that are proximate to each other in the grid of cells). For example, the value of node 11 is the average of the values of data labels assigned to nodes 20-23. In another example, the value of node 11 is the maximum value of data labels assigned to nodes 20-23. In another example, the value of node 11 is the minimum value of data labels assigned to nodes 20-23. Similar examples can describe the values of nodes 10, 12, 13, and 00. The values of the internal nodes may not be determined upon initialization of the tree data structure 305. For example, values of the internal nodes 10-13 are dynamically determined. Although FIG. 3 illustrates a tree data structure 305, any data structure can be used to map data labels to the grid of cells.

FIG. 3B illustrates portions of merged views 310 of the heat map 110 that can be displayed by the UI 105, according to one embodiment. The merged views 310 include grids 0-2 which can correspond to levels 0-2 of the tree data structure 305. Grid 0 includes cell 00. Grid 1 includes cells 10-13. Grid 2 includes cells 20-23 (and 12 other unlabeled cells). The grids include cells that are assigned values according to the tree data structure 305. For example, grid 1 is mapped to level 1 such that cell 10 is assigned the value of node 10, cell 11 is assigned the value of node 11, etc. The merged view 310 can include additional or fewer grids and cells than those shown in FIG. 3B. Although the cells are rectangular in FIG. 3B, it should be appreciated that in practice the cells can be any shape.

The grids 0-2 illustrate different zoom states of the heat map 110. For example, if the UI 105 displays the heat map 110 in a zoomed out state (e.g., decreased magnification), the heat map 110 may include grid 0 instead of grids 1 or 2. In another example, if the UI 105 displays the heat map 110 in a zoomed in state (e.g., increased magnification), the heat map may include grid 2 instead of grids 0 or 1. The number of available cells in each grid can be based on the number or size of pixels displaying the heat map 110. For example, grid 0 may be the size of a pixel. Thus, a single cell (cell 00) can be displayed in grid 0. In another example, the number of pixels displaying grid 1 can be four or greater. In response to a change in a zoom state, the cells may be merged until the size of a cell is equal to or greater than the size of a pixel through which the heat map 110 is displayed. For example, in response to a change in the zoom state, if four pixels are available to display grid 2, the cells of grid 2 may be merged such that grid 1 is displayed.

The values of the cells can be determined by the number available cells. For example, if a number of leaf nodes in level 2 exceeds the number of cells in grid 1, internal nodes from level 1 may be mapped to the cells of grid 1. Thus, a tree data structure enables the UI 105 to display a merged view of the heat map 110 by mapping the grid of cells to internal nodes of the tree data structure 305. Furthermore, due to the links of the tree data structure, in a merged view, the information of the data labels assigned to the leaf nodes is not lost, but is maintained and can continue to be accessed.

FIGS. 4A and 4B together illustrate a flow chart of a method 400 of rendering a heat map for presentation through a visual interface, according to one embodiment. The steps of method 400 may be performed in difference orders, and the method 400 may include different, additional, or fewer steps.

A plurality of data records are received 405 from one or more databases. Each data record has a label that can be selected from a plurality of labels. In some embodiments, the data records are sorted according to their labels.

The data labels are assigned 410 to leaf nodes of a data structure.

For a first zoom state, at least some of the leaf nodes are mapped 415 to cells in a grid of cells provided for display as part of a user interface (UI). The leaf nodes are mapped to their corresponding cells according to a layout method. In some embodiments, the layout method maps the leaf nodes to corresponding cells to a Hilbert curve.

According to the layout method, internal nodes of the data structure are connected 420 to corresponding pluralities of the leaf nodes. The connecting of an internal node is based on the layout method that maps the plurality of leaf nodes to cells that are proximate to each other in the grid of cells.

Values for the cells are determined 425. A value for a cell is based on data records having the label of the corresponding leaf node.

In a first zoom state, at least a portion of the grid of cells is provided 430 for display in the heat map. A display property of each displayed cell is based on the value for that cell. In the first zoom state, the number of leaf nodes to be displayed is less than or equal to a number of cells in the grid.

For a second zoom state, at least some of the internal nodes are mapped 435 to corresponding cells in the grid of cells. In the second zoom state, a number of leaf nodes to be displayed exceeds the number of cells in the grid.

In some embodiments, the number of cells in the grid is determined by merging the cells in the grid until the size of the cells of the grid is equal to or greater than the size of pixels of the display through which the heat map is displayed in the UI. In some embodiments, the number of cells in the grid is equal to a number of pixels available to display in the heat map of the UI. In some embodiments, a level of the data structure that includes internal nodes to be displayed is determined. The level is determined such that the number of internal nodes of the level is equal to or less than the number of pixels through which the heat map is displayed.

Updated values for the cells are determined 440. The updated values are based on data records having a label corresponding to one of the leaf nodes connected to the internal node. In some embodiments, a value of an internal node is the average of the values of children nodes (e.g., leaf nodes) of the internal node. In some embodiments, a value of an internal node is the largest value of the values of children nodes (e.g., leaf nodes) of the internal node. In some embodiments, a value of an internal node is the smallest of the values of children nodes (e.g., leaf nodes) of the internal node.

In the second zoom state, at least a portion of the grid of cells is provided 445 for display in the heat map. An updated display property of each displayed cell is based on the updated value for that cell.

In some embodiments, in response to a user selecting a cell of the grid, the UI displays a label and a value of a corresponding leaf node mapped to the cell.

Figure 5:
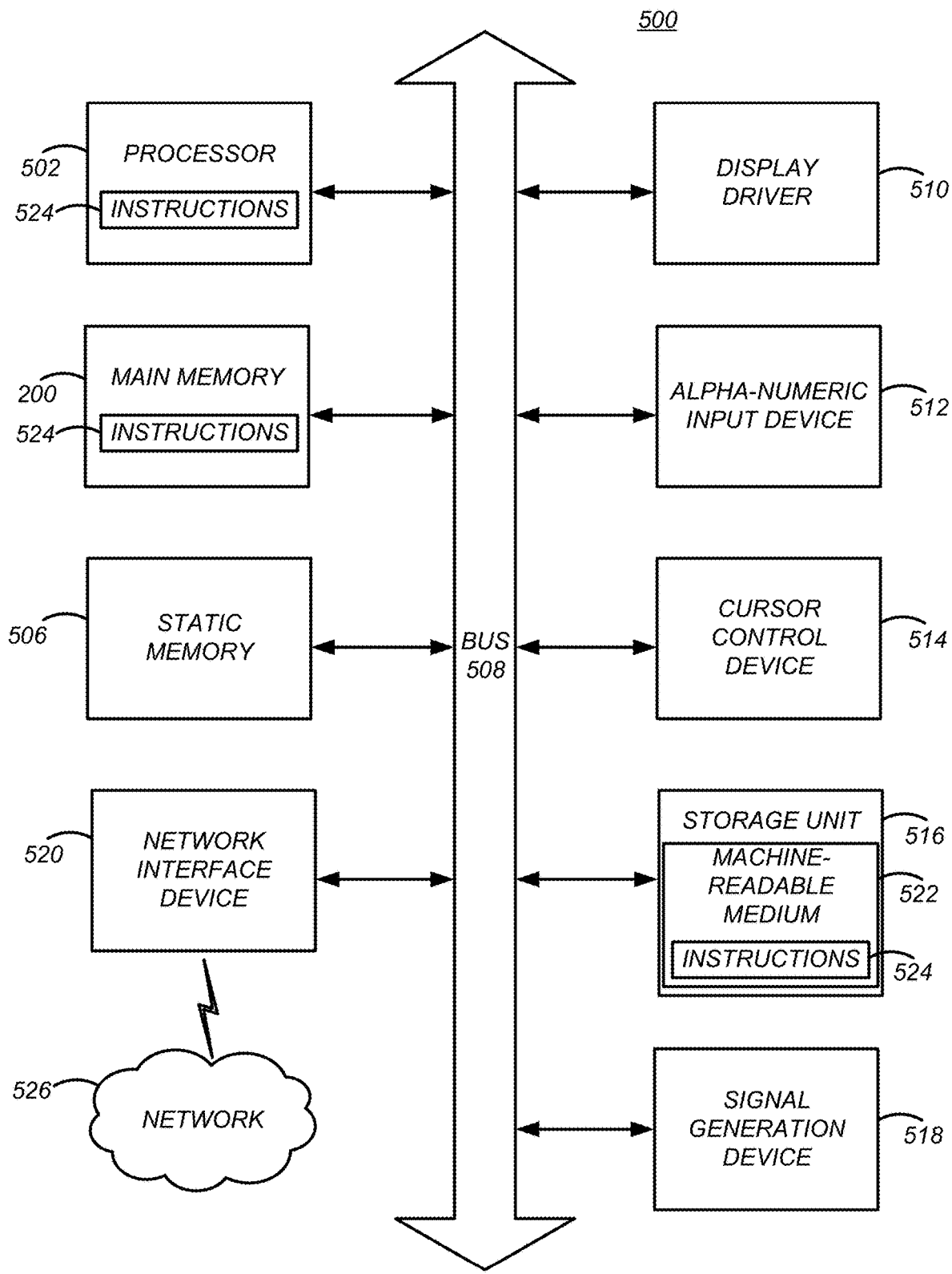
FIG. 5 is a block diagram illustrating components of an example machine able to read instructions from a machine-readable medium and execute them in a processor (or controller), according to one embodiment.

FIG. 5 is a block diagram illustrating components of an example machine able to read instructions from a machine-readable medium and execute them in a processor (or controller), according to one embodiment. Specifically, FIG. 5 shows a diagrammatic representation of a machine in the example form of a computer system 500. The computer system 500 can be used to execute instructions 524 (e.g., program label or software) for causing the machine to perform any one or more of the methodologies (or processes) described herein, such as method 400. In some embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an interne of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 200. The computer system may include a storage unit 516. The processor 502, memory 200, and the storage unit 516 communicate via a bus 508.

In addition, the computer system 500 can include a static memory 506 and a display driver 510 (e.g., to drive a plasma display panel (PDP), a liquid crystal display (LCD), or a projector capable of displaying the UI 105 to a user). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., the software modules described in FIG. 2) embodying any one or more of the methodologies or functions described herein. The instructions 524 may also reside, completely or at least partially, within the main memory 200 or within the processor 502 (e.g., within a processor's cache memory) during execution thereof by the computer system 500, the main memory 200 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method of rendering a heat map for presentation through a visual interface, comprising:
receiving from one or more databases, a plurality of data records, each data record having a label selected from a plurality of labels;
assigning labels to leaf nodes of a data structure;
mapping, for a first zoom state, at least some of the leaf nodes to corresponding cells in a grid of cells provided for display as part of a user interface (UI), the leaf nodes mapped to corresponding cells according to a layout method;
connecting, according to the layout method, internal nodes of the data structure to corresponding pluralities of the leaf nodes, the connecting of a particular internal node based on the layout method mapping the corresponding plurality of leaf nodes to cells that are proximate in the grid of cells;
determining values for the cells, a value for a cell based on data records having the label of the corresponding leaf node;
providing for display in the heat map, in the first zoom state for which a number of leaf nodes to be displayed is less than or equal to a number of cells in the grid, at least a portion of the grid of cells, a display property of each displayed cell based on the value for that cell;
mapping, for a second zoom state, wherein in the second zoom state a number of leaf nodes to be displayed exceeds the number of cells in the grid, at least some of the internal nodes to corresponding cells in the grid of cells;
determining updated values for the cells, the updated values based on data records having a label corresponding to one of the leaf nodes connected to the internal node;

providing for display in the heat map, in the second zoom state, at least a portion of the grid of cells, an updated display property of each displayed cell based on the updated value for that cell;
accessing data records corresponding to a cell by traversing the data structure from an internal node corresponding to the cell to leaf nodes connected to the internal node; and
simultaneous to the second zoom state being displayed and responsive to a user selecting a cell of the at least a portion of the grid of cells, providing for display, for each leaf node mapped to the selected cell, information of the label assigned to the leaf node.

2. The method of claim 1, wherein the number of cells in the grid is equal to a number of pixels available to display the heat map in the UI.

3. The method of claim 2, wherein the data structure is a tree data structure and wherein mapping, for a second zoom state, at least some of the internal nodes to corresponding cells in the grid of cells further comprises:
determining a level of the tree data structure that includes a number of internal nodes wherein the number of internal nodes is equal to or less than the number of pixels through which the heat map is displayed.

4. The method of claim 1, wherein the number of cells in the grid is determined by merging the cells in the grid until a size of the cells of the grid is equal to or greater than the size of pixels of the display through which the heat map is displayed in the UI.

5. The method of claim 1, wherein a value of an internal node is the average of the values of children nodes of the internal node.

6. The method of claim 1, wherein a value of an internal node is the largest value of the values of children nodes of the internal node.

7. The method of claim 1, wherein a value of an internal node is the smallest of the values of children nodes of the internal node.

8. The method of claim 1, wherein, in response to a user selecting a cell of the at least a portion of the grid of cells, the UI displays a label and a value of a corresponding leaf node mapped to the cell.

9. The method of claim 1, wherein the layout method maps the leaf nodes to corresponding cells to a Hilbert curve.

10. The method of claim 1, further comprising:
receiving user input that includes inclducs a keyword search term;
identifying leaf nodes that correspond to data records associated with the keyword search term;
identifying internal nodes that are connected to the identified leaf nodes; and
simultaneous to the second zoom state being displayed, visually distinguishing cells mapped to the identified internal nodes.

11. A non-transitory computer readable medium comprising stored instructions that when executed by at least one processor configures the at least one processor to:
receive from one or more databases, a plurality of data records, each data record having a label selected from a plurality of labels;
assign labels to leaf nodes of a data structure;
map, for a first zoom state, at least some of the leaf nodes to corresponding cells in a grid of cells provided for display as part of a user interface (UI), the leaf nodes mapped to corresponding cells according to a layout method;
connect, according to the layout method, internal nodes of the data structure to corresponding pluralities of the leaf nodes, the connecting of a particular internal node based on the layout method mapping the corresponding plurality of leaf nodes to cells that are proximate in the grid of cells;
determine values for the cells, a value for a cell based on data records having the label of the corresponding leaf node;
provide for display in a heat map, in the first zoom state for which a number of leaf nodes to be displayed is less than or equal to a number of cells in the grid, at least a portion of the grid of cells, a display property of each displayed cell based on the value for that cell;
map, for a second zoom state, wherein in the second zoom state a number of leaf nodes to be displayed exceeds the number of cells in the grid, at least some of the internal nodes to corresponding cells in the grid of cells;
determine updated values for the cells, the updated values based on data records having a label corresponding to one of the leaf nodes connected to the internal node;
provide for display in the heat map, in the second zoom state, at least a portion of the grid of cells, an updated display property of each displayed cell based on the updated value for that cell;
access data records corresponding to a cell by traversing the data structure from an internal node corresponding to the cell to leaf nodes connected to the internal node; and
simultaneous to the second zoom state being displayed and responsive to a user selecting a cell of the at least a portion of the grid of cells, provide for display, for each leaf node mapped to the selected cell, information of the label assigned to the leaf node.

12. The computer readable medium of claim 11, wherein the number of cells in the grid is equal to a number of pixels available to display the heat map in the UI.

13. The computer readable medium of claim 12, wherein the data structure is a tree data structure and wherein the instructions to map, for a second zoom state, further comprises instructions that when executed configures the at least one processor to:
determine a level of the tree data structure that includes a number of internal nodes wherein the number of internal nodes is equal to or less than the number of pixels through which the heat map is displayed.

14. The computer readable medium of claim 11, wherein the number of cells in the grid is determined by merging the cells in the grid until the size of the cells of the grid is equal to or greater than the size of pixels of the display through which the heat map is displayed in the UI.

15. The computer readable medium of claim 11, wherein a value of an internal node is the average of the values of children nodes of the internal node.

16. The computer readable medium of claim 11, wherein a value of an internal node is the largest value of the values of children nodes of the internal node.

17. The computer readable medium of claim 11, wherein a value of an internal node is the smallest of the values of children nodes of the internal node.

18. The computer readable medium of claim 11, further comprising instructions that when executed configures the at least one processor to provide for display in the UI, in response to a user selecting a cell of the at least a portion of the grid of cells, a label and a value of a corresponding leaf node mapped to the cell.

19. The computer readable medium of claim 11, wherein the layout method maps the leaf nodes to corresponding cells to a Hilbert curve.

20. A computer system comprising:
one or more processors; and
a computer readable medium comprising stored instructions that when executed by the one or more processors configure the one or more processors to:
receive from one or more databases, a plurality of data records, each data record having a label selected from a plurality of labels;
assign labels to leaf nodes of a data structure;
map, for a first zoom state, at least some of the leaf nodes to corresponding cells in a grid of cells provided for display as part of a user interface (UI), the leaf nodes mapped to corresponding cells according to a layout method;
connect, according to the layout method, internal nodes of the data structure to corresponding pluralities of the leaf nodes, the connecting of a particular internal node based on the layout method mapping the corresponding plurality of leaf nodes to cells that are proximate in the grid of cells;
determine values for the cells, a value for a cell based on data records having the label of the corresponding leaf node;
provide for display in a heat map, in the first zoom state for which a number of leaf nodes to be displayed is less than or equal to a number of cells in the grid, at least a portion of the grid of cells, a display property of each displayed cell based on the value for that cell;
map, for a second zoom state, wherein in the second zoom state a number of leaf nodes to be displayed exceeds the number of cells in the grid, at least some of the internal nodes to corresponding cells in the grid of cells;
determine updated values for the cells, the updated values based on data records having a label corresponding to one of the leaf nodes connected to the internal node;
provide for display in the heat map, in the second zoom state, at least a portion of the grid of cells, an updated display property of each displayed cell based on the updated value for that cell;
access data records corresponding to a cell by traversing the data structure from an internal node corresponding to the cell to leaf nodes connected to the internal node; and
simultaneous to the second zoom state being displayed and responsive to a user selecting a cell of the at least a portion of the grid of cells, provide for display, for each leaf node mapped to the selected cell, information of the label assigned to the leaf node.

21. The computer system of claim 20, wherein the number of cells in the grid is equal to a number of pixels available to display the heat map in the UI.

* * * * *